Dec. 3, 1968     D. M. BANKSTON     3,414,004
FILM INJECTOR

Filed May 16, 1966     2 Sheets-Sheet 1

DALE M. BANKSTON
INVENTOR.

BY Buell B. Hamilton

ATTORNEY:

DALE M. BANKSTON
INVENTOR.

United States Patent Office 3,414,004
Patented Dec. 3, 1968

3,414,004
FILM INJECTOR
Dale M. Bankston, Tulsa, Okla., assignor to Pan American Petroleum Corporation, Tulsa, Okla., a corporation of Delaware
Filed May 16, 1966, Ser. No. 550,523
5 Claims. (Cl. 137—237)

This invention relates to the transportation of viscous liquids in conduits. More particularly, it relates to apparatus for forming a film of less viscous liquid on the inner surface of the conduit to decrease the resistance to flow.

Many efforts have been made over the past 20 to 30 years to use films of water in pipelines, to decrease the power necessary to pump viscous liquids through the pipelines. For example, some work along this line was reported in the Canadian Journal of Chemical Engineering for February 1961, starting on page 27. The references listed on page 36 of this article report other work.

Specialized apparatus for forming films of low viscosity liquids has been proposed. Examples are found in U.S. Patent 2,821,205, Chilton et al., and U.S. Patent 3,196,947, Van Poollen. Under certain conditions, such as great viscosity contrast between the transported liquid and the film-forming liquid, the apparatus previously proposed can provide films which produce considerable improvement in flow. Still greater improvement is desirable, however, particularly in cases of smaller viscosity contrast between transported and film-forming liquids and when very thin films of low viscosity liquid are used.

An object of this invention is to provide film-forming apparatus which produces improved films inside conduits transporting viscous liquids. Still other objects will be apparent from the following description and claims.

In general, my apparatus includes a first central conduit for the transported viscous liquid and a second conduit surrounding the first conduit and coaxial therewith. The film-forming liquid flows through the annular space between the two conduits. The distance between the two conduits preferably is substantially equal to the desired thickness of the film. The length of the annular channel is at least equal to the diameter of the inner conduit to insure that the transported viscous liquid and the film-forming liquid are flowing substantially parallel when they meet. In operation, the two streams are preferably pumped at rates which cause the thickness of the film to remain substantially constant when the two streams meet. Thus, the transported liquid floats out onto a preformed film already at the desired thickness and flowing parallel to the viscous liquid.

Figure 1:
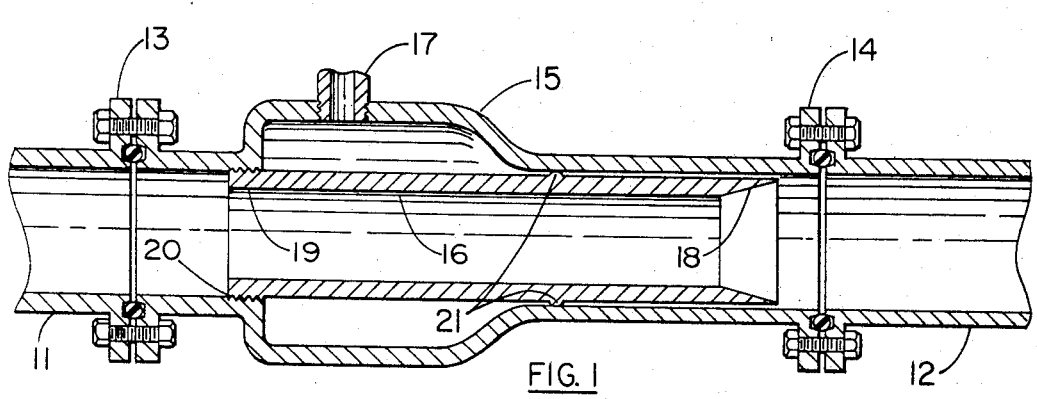
Figure 2:
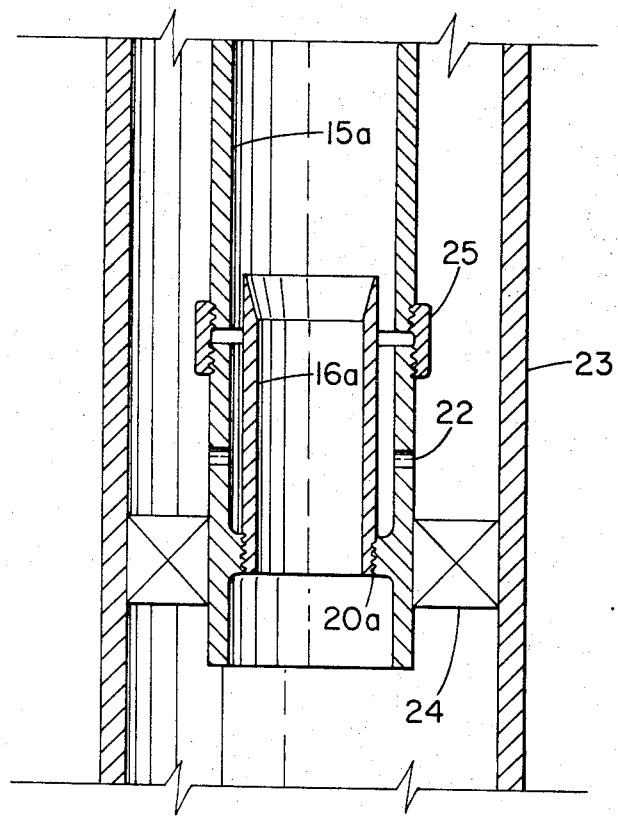
Figure 3:
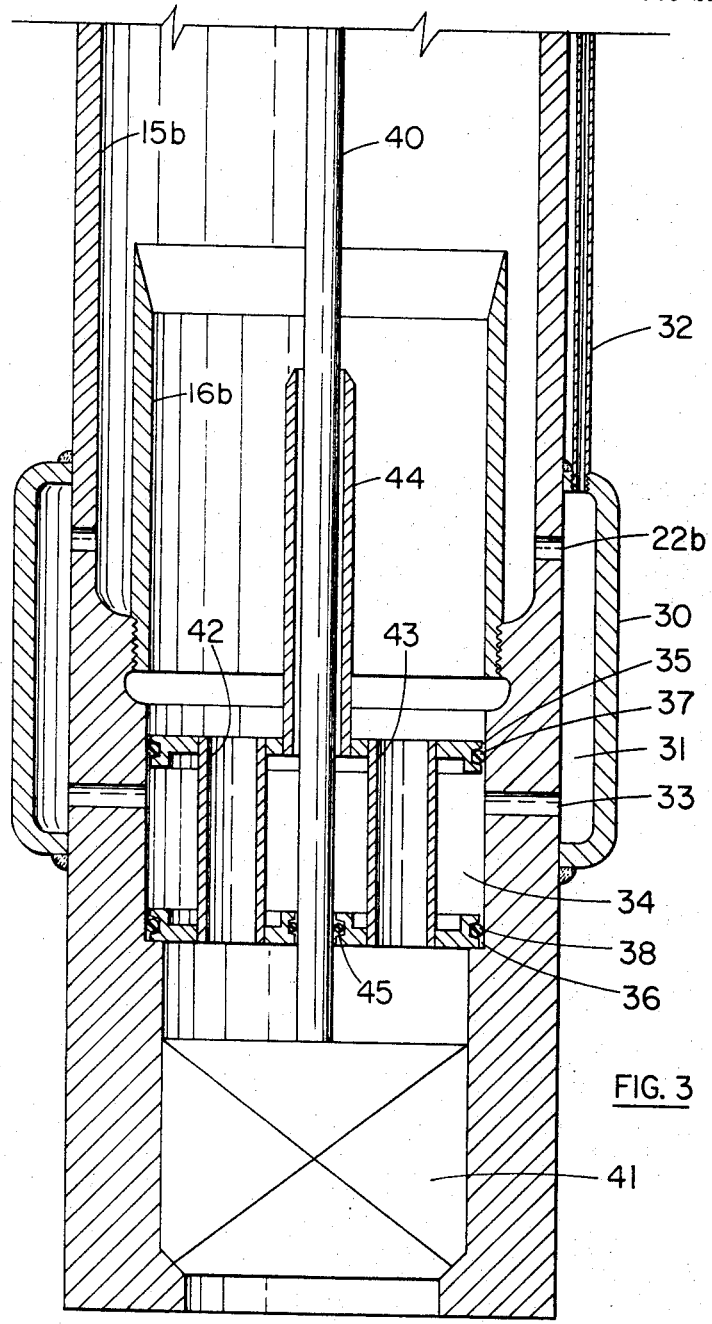

My invention will be better understood from the drawing in which FIGURE 1 is a view in cross-section of one embodiment of my invention adapted for use in horizontal pipelines. FIGURE 2 is a view in cross-section of an embodiment of my invention adapted for use in a flowing well. FIGURE 3 shows a cross-sectional view of apparatus in accordance with my invention for use in a pumping well.

In FIGURE 1 of the drawing the transported liquid enters the film injector through flow line or conduit 11 and leaves through flow line 12. Both lines are of substantially the same diameter. The injector is preferably attached to the flow lines by flanges 13 and 14 so the entire injector can be removed for adjustment as described later.

In the injector itself a housing 15 surrounds an inner tube or sleeve 16. A conduit 17 is provided through which the film-forming liquid can be injected into the housing surrounding the inner tube. Housing 15 is aligned with a straight section of the conduit carrying the viscous liquid. The housing is constricted at its downstream end to approximately the diameter of flow line 12. Inner tube 16 extends into this constricted portion to a distance of at least one diameter of the inner tube. Conduit 16 is of substantially uniform diameter. The downstream end 18 of tube 16 is preferably beveled. The term "substantially uniform diameter" is intended to include the beveled portion of the conduit. Tube 16 is attached and sealed at its upstream end 19 to housing 15 by any suitable means, such as welding. Preferably, however, tube 16 is attached and sealed to housing 15 by means of threads 20 to facilitate replacement of tube 16 with a tube either larger or smaller in diameter to adjust the thickness of film flowing in the annular channel between the inner tube and the housing. A series of small beads 21 may be used around tube 16 at a location spaced upstream from the downstream end of tube 16. The beads may, of course, be placed on the inner surface of housing 15. These beads prevent tube 16 from varying too far from a position concentric with, and substantially parallel to, the constricted portion of housing 15.

In operation, the transported viscous liquid, such as crude petroleum oil, is pumped through flow line 11, through inner tube 16 and on into flow line 12. At the same time, a film-forming liquid is injected through conduit 17 into the large portion, or injection chamber, of housing 15, through the annular channel between the housing and tube 16 and into conduit 12. As the annular stream of film-forming liquid flows into conduit 12, the transported liquid flows out of the tube 16 onto the film. Both streams are flowing substantially parallel and preferably at velocities which produce the least possible chance of turbulence. This assures the best possible persistence of the film as the film-surrounded viscous liquid flows through conduit 12.

One characteristic of the system should be pointed out. As soon as the viscous liquid emerges from tube 16 and begins sliding along on the low viscosity film, the surface in contact with the film travels at nearly the same velocity as the rest of the viscous liquid, that is at about the average velocity of the plug of viscous liquid. The film, on the other hand, travels at various speeds throughout its thickness, from maximum velocity in contact with the viscous liquid plug down to substantially zero at the conduit surface. The average velocity of the film is, thus, about half the velocity of the maximum speed portion, or about half the average velocity of the viscous liquid. For this reason, if the thickness of the film is to return substantially constant before and after contacting the viscous liquid, the average velocity of flow of the film becore contact should be about one-half the average velocity of the viscous liquid both before and after contact.

Even if a constant film thickness is maintained, a major change in flow pattern of the film must take place. Before meeting the viscous liquid, the film is dragging against fixed surfaces on both its inside and outside surfaces. After meeting the viscous liquid, the outside of the film still drags against the fixed inner surface of the conduit, but the inside surface of the film is now dragged along by the flowing viscous liquid.

Any readjustments of the low-viscosity film-forming liquid are not too important, however, as long as the direction of flow is substantially parallel to the direction of flow of the viscous liquid. The main thing to avoid is impingement of the entire mass of film-forming liquid against the viscous liquid plug at a substantial angle. The momentum in such a case tends to drive the film-forming liquid into the viscous liquid. Dissipation of the radial component of kinetic energy necessarily causes considerable turbulence. This turbulence is avoided by insuring substantially parallel flow of the two streams before contact.

My invention will be better understood from the following example. An injector was built similar to that shown in the drawing. The inner sleeve or tube 16 was of stainless steel. The downstream pipe was brass tubing about ½ inch in diameter. The brass tubing surrounded about the last three inches of the downstream end of the stainless steel tube. In tests made with this apparatus the clearance between the steel and brass tubing was 0.0025 inch in some cases and 0.0045 inch in others.

In the tests, a solution of petroleum jelly in Stoddard solvent was used as the viscous stream. The film-forming liquid was an aqueous dispersion of flax meal gum in water.

The tests were conducted by first pumping the viscous liquid through the brass tubing at a controlled rate without a film and measuring the pressure drop along the tube. The temperature was also recorded since the pressure drop was found to vary considerably with temperature because of the change in viscosity of the viscous oil with temperature. After a pressure drop was established with no film, a film was injected at a constant controlled rate while holding the flow of viscous liquid constant until an equilibrium pressure drop was again reached. Results of the tests are shown in the following table.

viscosity liquids ordinarily used for forming films, the passage must either be quite long, or very narrow. To keep the injector in a reasonable size range, the passage is usually rather short. Therefore, the clearance between the housing and the sleeve is usually somewhat less than the thickness of the film formed around the transported liquid. Tests 6, 7 and 8 in the table show this is satisfactory.

Tests 9 and 10 were run with more viscous oil. The oil was more viscous partly because of more petroleum jelly in the solvent and partly because of the lower temperatures at which Tests 9 and 10 were run. The reduction in pressure drop by a factor of 4 or 5 is, of course, very important. Of considerable interest is the decrease in pressure drop along the pipe with increase in the oil viscosity when a film is used. In Test 5, with the less viscous oil, the pressure drop along the tube was 37 pounds per square inch with a 75 to 1 oil to film ratio. In Test 9 the pressure drop along the tube was only 26.5 pounds per square inch with the much more viscous oil at an 80 to 1 oil to film ratio. With the thicker films used in tests 8 and 10, the difference is not so great, but the more viscous oil again produced a slightly smaller pressure drop than the less viscous oil when the film was used. A possible explanation is that the more viscous oil flows more

| Test No. | Ratio visc. liq. to film | Clearance between tubes, in. | Thickness film, in. | Temp., °F. | Pressure, p.s.i. | | Pressure reduction factor |
|---|---|---|---|---|---|---|---|
| | | | | | No film | With film | |
| 1 | 332:1 | 0.0025 | 0.00075 | 83 | 57.3 | 54.7 | 1.046 |
| 2 | 246:1 | 0.0025 | 0.0010 | 89 | 44.5 | 41.5 | 1.078 |
| 3 | 150:1 | 0.0045 | 0.0017 | 81 | 66 | 61 | 1.082 |
| 4 | 100:1 | 0.0045 | 0.0025 | 81 | 61 | 57 | 1.158 |
| 5 | 75:1 | 0.0045 | 0.0033 | 84.5 | 55 | 37 | 1.49 |
| 6 | 29:1 | 0.0045 | 0.0086 | 86 | 54 | 33 | 1.64 |
| 7 | 20:1 | 0.0045 | 0.0125 | 86 | 54 | 28 | 1.93 |
| 8 | 13:1 | 0.0045 | 0.019 | 86 | 54 | 26 | 2.08 |
| 9 | 80:1 | 0.0045 | 0.0031 | 67.5 | *111.5 | 26.5 | 4.2 |
| 10 | 13:1 | 0.0045 | 0.019 | 65.5 | *137 | 25 | 5.5 |

*Tests 9 and 10 run with 73 lb. petroleum jelly in 50 lb. solvent. Tests 1 to 8 run with 60 lb. petroleum jelly in 50 lb. solvent.

Results of the first three tests are important principally because of the consistent improvements which were produced with very thin films. Using an injector in which the film entered at an angle to the flowing stream of viscous liquid the results with thin films were erratic, even when using the viscoelastic flax meal gum dispersions. Tests 1 and 3 are also important in showing that the film, as injected, can be more than three times the thickness of the film surrounding the moving viscous liquid and reproducible results will still be obtained if the flows of the film and viscous liquid are substantially parallel when they meet. Film thicknesses were calculated assuming the average velocity of the film was about one-half the velocity of the viscous liquid for reasons explained above.

Tests 4 to 8 show the better results which can be obtained by using lower ratios of viscous to film liquids. Tests such as 6, 7 and 8 are also important since they show the clearance between the inner sleeve and the outer housing can be considerably less than the thickness of the film after it emerges from the annular flow channel. It is preferred that a pressure difference of at least about 10 pounds per square inch be maintained across the annular flow channel. This insures that flow of film-forming liquid in this channel is not unduly affected by hydraulic head differences between the bottom and top of the passage, minor differences in channel width and the like.

For best results a pressure difference in the range from about 50 to about 100 pounds per square inch should be maintained across the annular flow channel to override all disturbing effects and insure a film of substantially uniform thickness surrounding the transported liquid where the film and transported liquids come together. In order to establish such pressure drops with the low-nearly as a pure plug, thus avoiding some of the energy-consuming internal motions of less viscous liquids. My injector is more advantageous with less viscous transported liquids since a stream of film-forming liquid impinging at a considerable angle against the transported liquid stream can cause greater turbulence in less viscous liquids than in more viscous transported liquids.

In the work reported above, the clearance between the tubes was changed by removing the inner tube providing the smaller clearance and replacing it with one having an external diameter 0.004 inch less than the first one. In the apparatus shown in FIGURE 1 of the drawing, use of an internal wrench inside tube 16 is necessary to make such a change. In practice, if many changes are anticipated, another connection where housing 15 is first constricted is advisable to permit the removal of the constricted part of the housing so external wrenches can be used on tube 16.

In the example, a viscoelastic aqueous film-forming liquid was used with a viscous oil. It will be obvious, however, that my apparatus can be used to form films of other liquids around other more viscous liquids. For example, non-viscous oil films may be formed around viscous aqueous solutions such as calcium chloride solutions or aqueous suspensions such as paper pulp suspensions. The films may be, and preferably are, viscoelastic liquids such as aqueous flax meal dispersions or hydrocarbon oil solutions of polyisobutylene. Use of viscoelastic liquids is claimed in copending U.S. patent application Ser. No. 491,900, filed by James L. Lummus on Sept. 30, 1965. The film-forming liquids may also be nonviscoelastic, particularly if the transported liquid is highly viscous, thus tending to prevent mixing of the film into the transported liquid. The film-forming liquid may also be soluble in the transported liquid as when non-viscous oil is used as the film for highly viscous oil.

My apparatus can also be used where the problem is protecting a surface of a conduit from contact with a transported liquid whether the transported liquid is viscous or not. For example, an oil film protects a steel pipe from contact with corrosive calcium chloride solution whether this solution is viscous or not. In pipelines carrying oils from which paraffin deposits, a film of water may prevent contact of the oil with the pipe surface and so prevent deposition of paraffin. In general, my apparatus can be used wherever a film of one liquid is to be formed on a surface past which another liquid is flowing.

My apparatus has been described to this point principally as applied to horizontal conduits such as pipelines filled with the liquid to be transported. It will be obvious, however, that the apparatus is also applicable to transportation through vertical conduits such as tubing in wells. FIGURE 2 shows one embodiment of such an application. In this figure the inner tube 16a within housing 15a forms an annular channel through which the film-forming liquid flows parallel to the vertically flowing liquid before the two streams meet at the upper end of tube 16a. Tube 16a is connected to the housing through threaded joint 20a. The film-forming liquid enters the annular channel through port 22 in housing 15a from the space between housing 15a and well casing 23.. A packer 24 is provided between the tubing and casing to direct the liquid through ports 22. A coupling 25 is provided in housing 15a below the top of tube 16a to facilitate replacement of the tube if desired. It will be noted in FIGURE 2 that at least a portion of housing 15a is actually simply a part of the tubing string.

FIGURE 3 shows another embodiment of my invention. In this case sleeve 16b forms an annular flow channel with tube 15b for causing parallel flow of film-forming and transported liquids before they meet. The film-forming liquid is introduced into this annular channel through ports 22b. Outside ports 22b a housing 30 surrounds the tubing to form a chamber 31 into which the film-forming liquid is introduced through small diameter tubing 32 extending to the earth's surface. This part of the equipment of FIGURE 3 can be used in the apparatus of FIGURE 2 in place of the packer in a flowing well. In a pumping well, however, use of the remainder of the equipment shown in FIGURE 3 is advisable although not always completely necessary.

Near the bottom of housing 30 a second port 33 extends through the tubing wall into a chamber 34 defined by plates 35 and 36. These plates include sealing rings 37 and 38 to form seals with the inner surface of tubing 15b. Sucker rods 40 extend through plates 35 and 36 to the pump shown diagrammatically as 41. Tubes 42 and 43 also extend through the plates and connect the portion of the well below chamber 34 to the portion of the well above this chamber. The well production flows through these tubes and on up the well.

To eliminate contact of the well fluids with the sucker rod the film-forming liquid is forced through ports 33, around tubes 42 and 43 and through sleeve 44 which surrounds the sucker rod and extends a distance above plate 35. The length of sleeve 44 and tube 16b should be long enough to permit well fluids passing through tubes 42 and 43 to become nonturbulent and assume a direction of flow parallel to that of the film-forming liquid flowing inside sleeve 44 and outside tube 16b. This distance should be at least equal to the diameter of the flowing stream of well fluids, or approximately the internal diameter of tube 16b. Preferably both tube 16b and sleeve 44 should have a length at least two or three times the diameter of the transported liquid stream. A seal 45 is provided in plate 36 around sucker rods 40 to avoid loss of film-forming liquids from the bottom of chamber 34.

In a pumping well, continuous flow of the film-forming liquid is possible. It is preferred, however, for the film-forming liquid to flow only on the up-stroke of the pump. In this way the film-forming liquid flows when the well fluids move upwardly in the well, but not otherwise. An accumulation of film-forming liquid at the tops of the sleeves is thus avoided. For example, a small pump at the earth's surface can be attached to the walking beam so it forces film-forming liquid down conduit 32 of FIGURE 3 only on the up-stroke of the rods.

Many other variations and examples of my invention will occur to those skilled in the art. Therefore, I do not wish to be limited to the examples described above but only by the following claims.

I claim:

1. Apparatus for forming a film of a first liquid on the internal surface of a conduit through which a second liquid flows, said apparatus comprising:
   an outer housing connected into and aligned with a straight section of said conduit,
   a sleeve within said housing, said sleeve being of substantially uniform diameter, being open to the flow of said second liquid through said sleeve, and being spaced from and substantially parallel to the inner surface of said housing, at least near the downstream end of said sleeve, to form an annular channel between said housing and said sleeve,
   a seal between said sleeve and said housing at the upstream end of said sleeve,
   and means for introducing said first liquid into said annular channel and causing flow of said first liquid through said flow channel,
   the downstream end of said sleeve being parallel to said housing for a distance equal to at least the internal diameter of said sleeve to cause substantially parallel flow of said first and second liquids at the downstream end of said sleeve where the liquids meet.

2. The apparatus of claim 1 in which said conduit is the tubing in a well.

3. The apparatus of claim 1 in which the length of said sleeve parallel to said housing and the clearance between the sleeve and housing are sufficient to establish a pressure drop of at least about 10 pounds per square inch across the annular flow channel between said sleeve and housing.

4. Apparatus for forming a film of a liquid on the internal surface of tubing and along the outside surface of sucker rods in a pumping oil well comprising:
   a housing aligned with and connected into said tubing,
   a first sleeve of substantially uniform diameter within said housing, said first sleeve being open for flow of well fluids upwardly through said first sleeve, and being spaced from and substantially parallel to the inner surface of said housing, at least near the upper end of said sleeve to form a first annular channel between said first sleeve and said housing,
   a seal between said first sleeve and said housing at the bottom of said first sleeve,
   a second sleeve surrounding said sucker rods, said second sleeve being of substantially uniform diameter and being spaced from and parallel to the outer surface of said sucker rods to form a second annular channel between said second sleeve and said rods,
   and means for introducing said liquid into said first and second annular channels and causing flow of said liquid up said channels,
   said sleeves being parallel to said housing and rods for a distance equal to at least the internal diameter of said first sleeve to cause substantially parallel flow of said liquid and said well fluids at the upper end of said sleeves where the liquid and well fluids meet.

5. The apparatus of claim 4 in which the lengths of said sleeves and the widths of said channels are sufficient to establish pressure drops of at least about 10 pounds per square inch across said channels.

References Cited

UNITED STATES PATENTS

| | | | |
|---|---|---|---|
| 2,821,205 | 1/1958 | Chilton et al. | 137—172 X |
| 2,924,950 | 2/1960 | Gustafson | 137—237 X |
| 3,040,760 | 6/1962 | Macks | 137—13 |
| 3,175,571 | 3/1965 | Bankert | 138—39 X |
| 3,196,947 | 7/1965 | Poollen | 137—237 X |
| 3,307,567 | 3/1967 | Gogarty et al. | 137—13 |

WILLIAM F. O'DEA, *Primary Examiner.*

D. H. LAMBERT, *Assistant Examiner.*